(12) United States Patent
Kohlenz et al.

(10) Patent No.: US 8,762,532 B2
(45) Date of Patent: Jun. 24, 2014

(54) APPARATUS AND METHOD FOR EFFICIENT MEMORY ALLOCATION

(75) Inventors: Mathias Kohlenz, San Diego, CA (US); Idreas Mir, San Diego, CA (US); Irfan Anwar Khan, Boulder, CO (US); Madhusudan Sathyanarayan, San Diego, CA (US); Shailesh Maheshwari, San Diego, CA (US); Srividhya Krishnamoorthy, San Diego, CA (US); Sandeep Urgaonkar, San Diego, CA (US); Thomas Klingenbrunn, San Diego, CA (US); Tim Tynghuei Liou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 743 days.

(21) Appl. No.: 12/540,761

(22) Filed: Aug. 13, 2009

(65) Prior Publication Data

US 2011/0040948 A1 Feb. 17, 2011

(51) Int. Cl.
*G06F 12/02* (2006.01)
*H04W 4/00* (2009.01)
*G06F 13/00* (2006.01)
*H04L 12/56* (2006.01)
*G06F 3/00* (2006.01)

(52) U.S. Cl.
CPC ........ *H04L 49/9042* (2013.01); *H04L 49/9005* (2013.01); *H04L 49/90* (2013.01); *H04L 49/901* (2013.01)
USPC ........... 709/226; 711/170; 711/171; 711/172; 711/173; 711/E12.001; 711/E12.002; 711/E12.003; 711/E12.004; 711/E12.005; 710/106; 370/392; 370/328

(58) Field of Classification Search
USPC .................. 709/213–215, 226; 370/328, 392; 710/106; 711/17–173, E12.001, 711/E12.002, E12.003, E12.004, E12.005
See application file for complete search history.

(56) References Cited

U.S. PATENT DOCUMENTS

| | | | |
|---|---|---|---|
| 4,338,673 A | 7/1982 | Brown |
| 4,709,332 A | 11/1987 | Morrison et al. |
| 4,980,824 A | 12/1990 | Tulpule et al. |
| 5,666,532 A | 9/1997 | Saks et al. |
| 5,721,739 A | 2/1998 | Lyle |
| 5,797,043 A | 8/1998 | Lewis et al. |
| 5,832,262 A | 11/1998 | Johnson et al. |

(Continued)

FOREIGN PATENT DOCUMENTS

| | | |
|---|---|---|
| CN | 1120197 A | 4/1996 |
| CN | 1825290 A | 8/2006 |

(Continued)

OTHER PUBLICATIONS

International Search Report and Written Opinion—PCT/US2010/045510, International Search Authority—European Patent Office—Jan. 26, 2011.

(Continued)

*Primary Examiner* — Alina N Boutah
(74) *Attorney, Agent, or Firm* — Darren M. Simon

(57) ABSTRACT

Incoming data frames are parsed by a hardware component. Headers are extracted and stored in a first location along with a pointer to the associated payload. Payloads are stored in a single, contiguous memory location.

24 Claims, 18 Drawing Sheets

(56) References Cited

U.S. PATENT DOCUMENTS

| | | |
|---|---|---|
| 5,850,526 A | 12/1998 | Chou |
| 5,870,394 A * | 2/1999 | Oprea .................... 370/392 |
| 5,915,094 A * | 6/1999 | Kouloheris et al. .......... 709/219 |
| 6,055,619 A | 4/2000 | North et al. |
| 6,285,404 B1 | 9/2001 | Frank |
| 6,421,730 B1 | 7/2002 | Narad et al. |
| 6,421,751 B1 | 7/2002 | Gulick |
| 6,542,537 B1 | 4/2003 | Peshkin et al. |
| 6,611,891 B1 | 8/2003 | Hewitt et al. |
| 6,708,233 B1 | 3/2004 | Fuller et al. |
| 6,768,992 B1 * | 7/2004 | Jolitz ........................... 1/1 |
| 6,985,974 B1 | 1/2006 | Medina |
| 7,103,597 B2 | 9/2006 | McGoveran |
| 7,356,039 B1 * | 4/2008 | DiMambro ................ 370/411 |
| 7,558,929 B2 | 7/2009 | Zohar et al. |
| 7,590,150 B1 * | 9/2009 | Damle et al. ............. 370/474 |
| 7,870,431 B2 | 1/2011 | Cirne et al. |
| 7,903,668 B2 * | 3/2011 | Kataoka et al. .......... 370/395.5 |
| 8,416,788 B2 * | 4/2013 | Colville et al. ........... 370/398 |
| 2002/0062352 A1 | 5/2002 | Asano et al. |
| 2003/0079160 A1 | 4/2003 | McGee et al. |
| 2003/0154353 A1 | 8/2003 | Merrill et al. |
| 2003/0160893 A1 | 8/2003 | Greenfield et al. |
| 2003/0231659 A1 * | 12/2003 | DiMambro et al. ......... 370/473 |
| 2004/0013117 A1 | 1/2004 | Hendel et al. |
| 2004/0057434 A1 * | 3/2004 | Poon et al. ............... 370/392 |
| 2004/0088498 A1 | 5/2004 | Accapadi et al. |
| 2004/0174877 A1 * | 9/2004 | Masputra et al. ........... 370/392 |
| 2004/0230855 A1 | 11/2004 | Au |
| 2005/0083934 A1 * | 4/2005 | Tan et al. .................. 370/392 |
| 2005/0157715 A1 * | 7/2005 | Hiddink et al. ............ 370/389 |
| 2005/0185608 A1 * | 8/2005 | Lee et al. .................. 370/328 |
| 2005/0262344 A1 | 11/2005 | Hepler et al. |
| 2006/0056435 A1 | 3/2006 | Biran et al. |
| 2006/0095567 A1 * | 5/2006 | Biran et al. ................ 709/224 |
| 2006/0123425 A1 * | 6/2006 | Ramarao et al. ........... 719/313 |
| 2006/0123467 A1 * | 6/2006 | Kumar et al. ................ 726/3 |
| 2006/0123477 A1 * | 6/2006 | Raghavan et al. ........... 726/22 |
| 2007/0005925 A1 | 1/2007 | Burkley et al. |
| 2007/0016908 A1 | 1/2007 | Kuroda |
| 2007/0033356 A1 | 2/2007 | Erlikhman |
| 2007/0136402 A1 | 6/2007 | Grose et al. |
| 2007/0206663 A1 | 9/2007 | Grover et al. |
| 2007/0220517 A1 | 9/2007 | Lippett |
| 2008/0071947 A1 | 3/2008 | Fischer et al. |
| 2008/0112472 A1 | 5/2008 | Oksman et al. |
| 2008/0250212 A1 | 10/2008 | Asaro et al. |
| 2008/0301697 A1 | 12/2008 | Southgate et al. |
| 2009/0016351 A1 * | 1/2009 | Patel et al. ................ 370/392 |
| 2009/0024872 A1 | 1/2009 | Beverly |
| 2009/0034542 A1 * | 2/2009 | He ........................... 370/400 |
| 2009/0092154 A1 * | 4/2009 | Malik et al. .................. 370/480 |
| 2009/0150135 A1 | 6/2009 | Cressman |
| 2009/0183161 A1 | 7/2009 | Kolinummi et al. |
| 2009/0254731 A1 * | 10/2009 | Maheshwari et al. ......... 711/171 |
| 2009/0300629 A1 | 12/2009 | Navon et al. |
| 2010/0011375 A1 * | 1/2010 | Kivinen ..................... 719/313 |
| 2010/0046405 A1 * | 2/2010 | Torsner et al. ............... 370/310 |
| 2010/0083253 A1 | 4/2010 | Kushwaha |
| 2010/0103864 A1 * | 4/2010 | Ulupinar et al. ............. 370/315 |
| 2010/0157904 A1 * | 6/2010 | Ho et al. .................... 370/328 |
| 2010/0226366 A1 * | 9/2010 | Lee et al. .................. 370/389 |
| 2010/0260126 A1 * | 10/2010 | Ulupinar et al. ............ 370/329 |
| 2010/0303074 A1 * | 12/2010 | Lioy et al. .................. 370/392 |
| 2011/0010519 A1 | 1/2011 | Cobley |
| 2011/0040947 A1 | 2/2011 | Kohlenz et al. |
| 2011/0041127 A1 * | 2/2011 | Kohlenz et al. ............. 718/100 |
| 2011/0041128 A1 * | 2/2011 | Kohlenz et al. ............. 718/100 |
| 2011/0099243 A1 * | 4/2011 | Keels et al. ................. 709/212 |
| 2011/0173441 A1 * | 7/2011 | Bagepalli et al. ............. 713/153 |
| 2011/0208867 A1 * | 8/2011 | Anthias et al. .............. 709/227 |
| 2012/0072508 A1 * | 3/2012 | Grigoriev et al. ............ 709/206 |
| 2013/0201998 A1 * | 8/2013 | Cornett et al. ............... 370/429 |

FOREIGN PATENT DOCUMENTS

| | | |
|---|---|---|
| EP | 0068108 | 1/1983 |
| EP | 1313011 | 5/2003 |
| EP | 1691288 A2 | 8/2006 |
| JP | S6373356 A | 4/1988 |
| JP | H05274279 A | 10/1993 |
| JP | H07282025 A | 10/1995 |
| JP | H10304006 A | 11/1998 |
| JP | H11110286 A | 4/1999 |
| JP | 2000222204 A | 8/2000 |
| JP | 2001101010 A | 4/2001 |
| JP | 2005322032 A | 11/2005 |
| JP | 2007026094 A | 2/2007 |
| WO | 2006003995 A1 | 1/2006 |
| WO | WO2008046716 | 4/2008 |

OTHER PUBLICATIONS

Wheeler K.B. "Memory Management in a Massively Parallel Shared-Memory Environment", University of Notre Dame, Apr. 2007, pp. 1-80.

* cited by examiner

APPARATUS AND METHOD FOR EFFICIENT MEMORY ALLOCATION

BACKGROUND

Reference to Co-Pending Applications for Patent

The present application for patent is related to the following co-pending U.S. patent applications:

"Apparatus and Method for Efficient Data Processing" having patent application Ser. No. 12/540,749, filed concurrently herewith, assigned to the assignee hereof, and expressly incorporated by reference herein;

"Apparatus and Method for Memory Management Efficient Data Processing" having patent application Ser. No. 12/540,756, filed concurrently herewith, assigned to the assignee hereof, and expressly incorporated by reference herein; and "Apparatus and Method for Distributed Data Processing" having patent application Ser. No. 12/540,775, filed concurrently herewith, assigned to the assignee hereof, and expressly incorporated by reference herein.

FIELD

This disclosure relates generally to data processing, and more specifically to techniques for more efficiently processing data using the hardware in a communication system.

BACKGROUND

Generally, the data processing functions within a communication system employ the use of software to implement numerous tasks. Such software normally provides the intelligence for certain hardware operations. Consequently, there must be close interaction between the software and hardware, thus requiring, in some instances, many steps to implement certain tasks. Dependence on software results in a number of disadvantages, including increased latencies, wasted bandwidth, increased processing load on the system microprocessor, and the like. As such, there is a need for a more efficient way of processing data while improving upon or eliminating the disadvantages brought about by the current paradigm where there is a need for close interaction between hardware and the software providing most of the intelligence for controlling such hardware.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a data processing method comprises receiving, at a hardware component, an input data stream comprising a plurality of protocol data units (PDUs); extracting a header from each of the PDUs and storing the extracted headers in a first memory location; and storing a payload from each of the PDUs in a contiguous block of a second memory location.

According to some aspects, a data processing apparatus comprising a partitioning unit for receiving an input data frame comprising a plurality of protocol data units (PDUs) and extracting a header from each of the PDUs; a first memory for storing the extracted headers; and a hardware concatenation unit for storing a payload from each of the PDUs in a contiguous block of a second memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
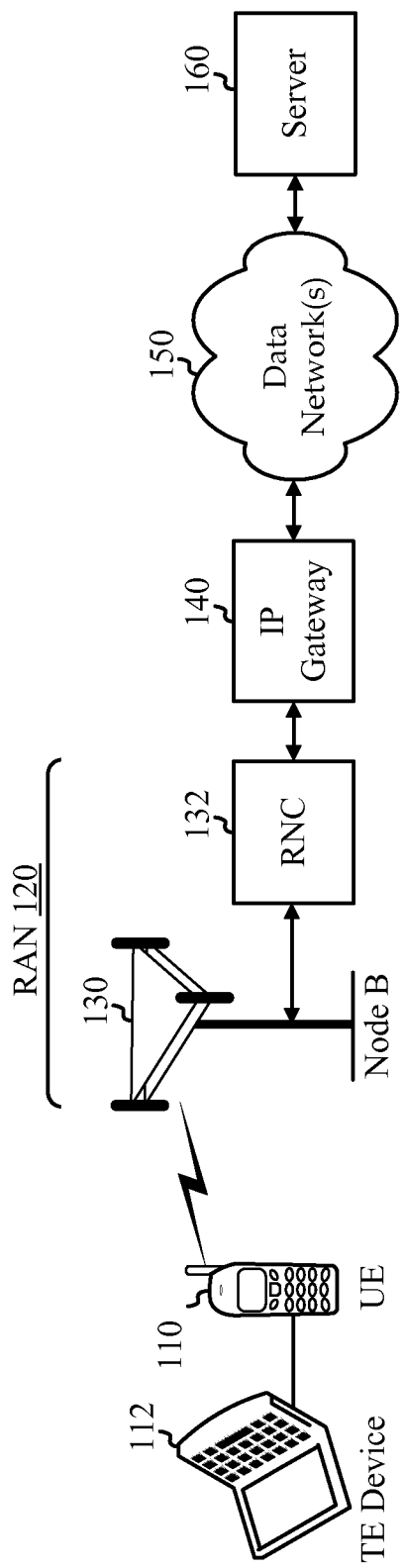
FIG. 1 depicts a wireless communication system, in accordance with various disclosed aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows a wireless communication system 100, which includes (i) a radio access network (RAN) 120 that supports radio communication for user equipments (UEs) and (ii) network entities that perform various functions to support communication services. RAN 120 may include any number of Node Bs and any number of Radio Network Controllers (RNCs). For simplicity, only one Node B 130 and one RNC 132 are shown in FIG. 1. A Node B is generally a fixed station that communicates with the UEs and may also be referred to as an evolved Node B, a base station, an access point, etc. RNC 132 couples to a set of Node Bs and provides coordination and control for the Node Bs under its control.

An Internet Protocol (IP) gateway 140 supports data services for UEs and may also be referred to as a Serving GPRS Support Node or Gateway GPRS Support Node (SGSN or GGSN), an Access Gateway (AGW), a Packet Data Serving Node (PDSN), etc. IP gateway 140 may be responsible for establishment, maintenance, and termination of data sessions for UEs and may further assign dynamic IP addresses to the UEs. IP gateways 140 may couple to data network(s) 150, which may comprise a core network, the Internet, etc. IP gateway 140 may be able to communicate with various entities such as a server 160 via data network(s) 150. Wireless system 100 may include other network entities not shown in FIG. 1.

A UE 110 may communicate with RAN 120 to exchange data with other entities such as server 160. UE 110 may be stationary or mobile and may also be referred to as a mobile station, a terminal, a subscriber unit, a station, etc. UE 110 may be a cellular phone, a personal digital assistant (PDA), a wireless communication device, a wireless modem, a handheld device, a laptop computer, etc. UE 110 may communicate with Node B 120 via air interfaces, such as a downlink and an uplink. The downlink (or forward link) refers to the communication link from the Node B to the UE, and the reverse link (or uplink) refers to the communication link from the UE to the Node B. The techniques described herein may be used for data transmission on the downlink as well as the uplink.

In some aspects, UE 110 may be coupled to a terminal equipment (TE) device 112 via a wired connection (as shown in FIG. 1) or a wireless connection. UE 110 may be used to provide or support wireless data services for TE device 112. TE device 112 may be a laptop computer, a PDA, or some other computing device.

Figure 2:
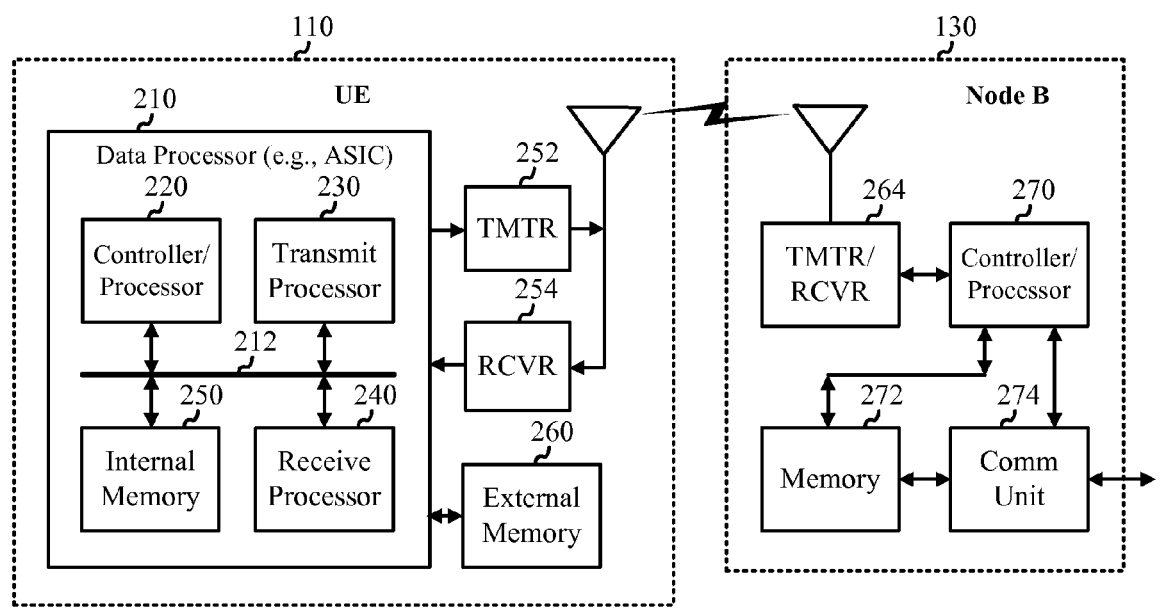
FIG. 2 depicts a user equipment and Node B, in accordance with various disclosed aspects.

FIG. 2 shows a block diagram of an exemplary design of UE 110 and Node B 130 in FIG. 1. In this exemplary design, UE 110 includes a data processor 210, an external memory 260, a radio transmitter (TMTR) 252, and a radio receiver (RCVR) 254. Data processor 210 includes a controller/processor 220, a transmit processor 230, a receive processor 240, and an internal memory 250. A bus 212 may facilitate data transfers between processors 220, 230 and 240 and memory 250. Data processor 210 may be implemented on an application specific integrated circuit (ASIC), and memory 260 may be external to the ASIC.

For data transmission on the uplink, transmit processor 230 may process traffic data in accordance with a set of protocols and provide output data. Radio transmitter 252 may condition (e.g., convert to analog, filter, amplify, and frequency upconvert) the output data and generate an uplink signal, which may be transmitted to Node B 230. For data reception on the downlink, radio receiver 254 may condition (e.g., filter, amplify, frequency downconvert, and digitize) a downlink signal received from Node B 230 and provide received data. Receive processor 240 may process the received data in accordance with a set of protocols and provide traffic data. Controller/processor 220 may direct the operation of various units at UE 110. Internal memory 250 may store program codes and data for processors 220, 230 and 240. External memory 260 may provide bulk storage for data and program codes for UE 110.

FIG. 2 also shows a block diagram of an exemplary design of Node B 130. A radio transmitter/receiver 264 may support radio communication with UE 110 and other UEs. A controller/processor 270 may process data for data transmission on the downlink and data reception on the uplink. Controller/processor 270 may also perform various functions for communication with the UEs. Memory 272 may store data and program codes for Node B 130. A communication (Comm) unit 274 may support communication with other network entities.

Figure 3:
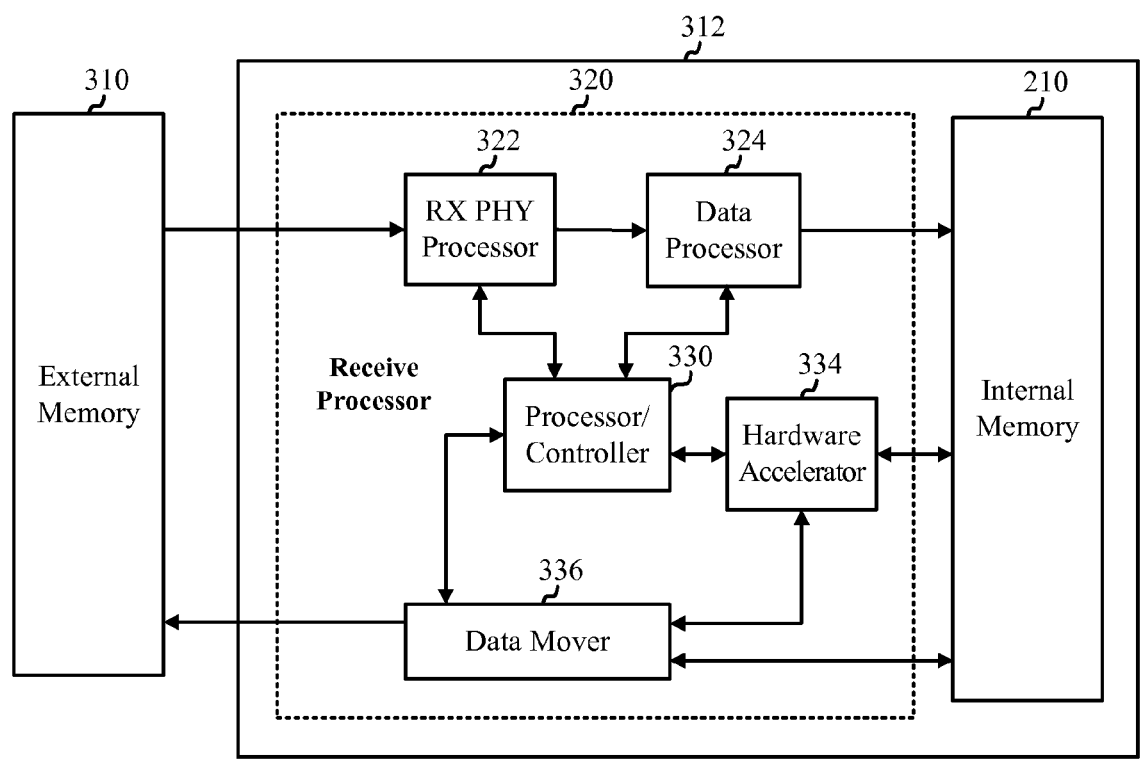
FIG. 3 depicts a receiver, in accordance with various disclosed aspects.

FIG. 3 depicts an exemplary design of a receiver 300, which may be part of UE 110. Receiver 300 includes an external memory 310 that provides bulk storage of data, a receive processor 320 that processes received data, and an internal memory 340 that stores processed data. Receive processor 320 and internal memory 340 may be implemented on an ASIC 312.

Within receive processor 320, an RX PHY processor 322 may receive PHY frames from a transmitter (e.g., Node B 130), process the received PHY frames in accordance with the radio technology (e.g., CDMA2000 1X or 1xEV-DO or LTE) used by the RAN, and provide received frames. A data processor 324 may further process (e.g., decode, decipher, and de-frame) the received frames.

Data transfer typically involves three tasks. First, data is moved in from some location, such as external memory 310. The data is then operated on by hardware, and moved back out. Data mover 336 may be configured to move data in from one location to another, and to move the data back out after processing by hardware accelerator 334. Processor/controller 330 may be configured to control the operation of hardware accelerator 334 and data mover 336.

Figure 4:
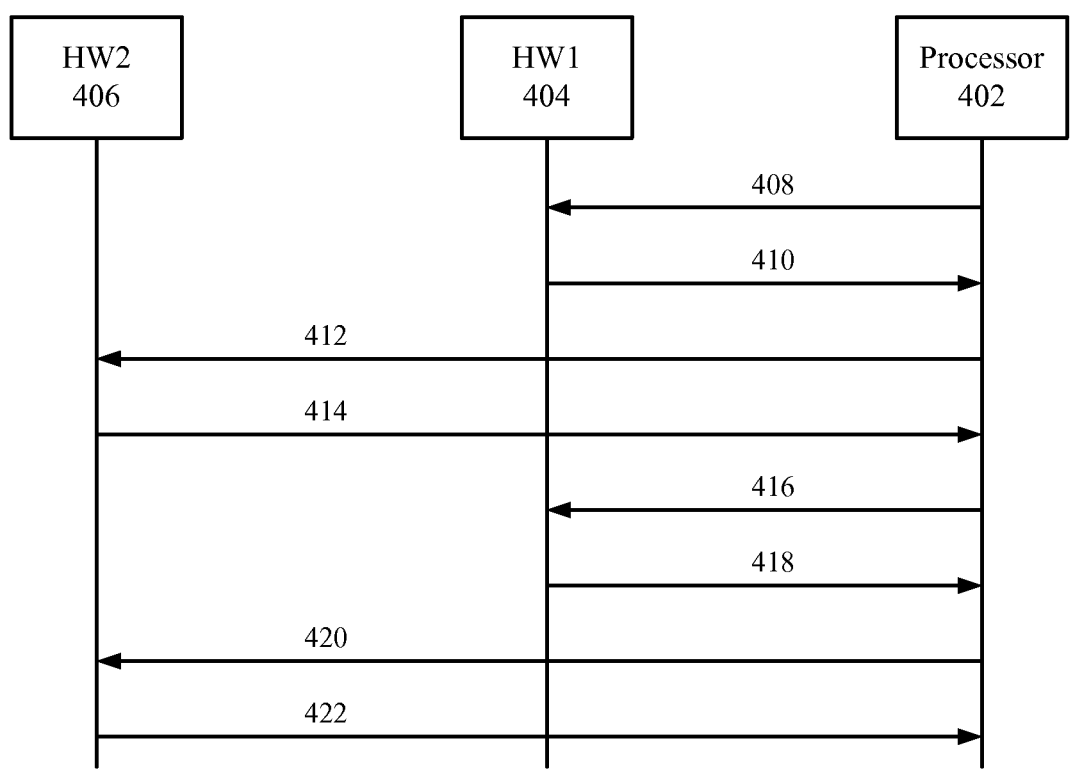
FIG. 4 is a data flow diagram depicting a data processing operation, in accordance with various disclosed aspects.

FIG. 4 is a data flow diagram depicting typical data processing operations occurring in software and hardware. As depicted in FIG. 4, a software component 402 may interface with one or more hardware components such as a first hardware component 404 and a second hardware component 406. As depicted at step 408, software component 402 may issue a first set of instructions to first hardware component 404. The instructions may include instructions to perform one or more tasks. The first hardware component 404 then responds to the initial set of instructions, as depicted at 410. To begin processing with the second hardware component 406, software component 402 may then send a set of instructions to second hardware component 406, as depicted at 412, and await a response, as depicted at 414. Each time a task is to be executed, software 402 must issue an instruction or set of instructions to the designated hardware component, and await a response, as depicted at 416, 418, 420 and 422.

In the method depicted in FIG. 4, software interrupts must be used after every hardware task or set of tasks. That is, after completing the provided instructions, a hardware component must send an interrupt to software. These interrupts may be costly, as the program context must be stalled, and built anew to perform the interrupt, and then to resume hardware processing. Moreover, interrupts often become locked, resulting in a latent period until the interrupt lock is resolved.

Figure 5:
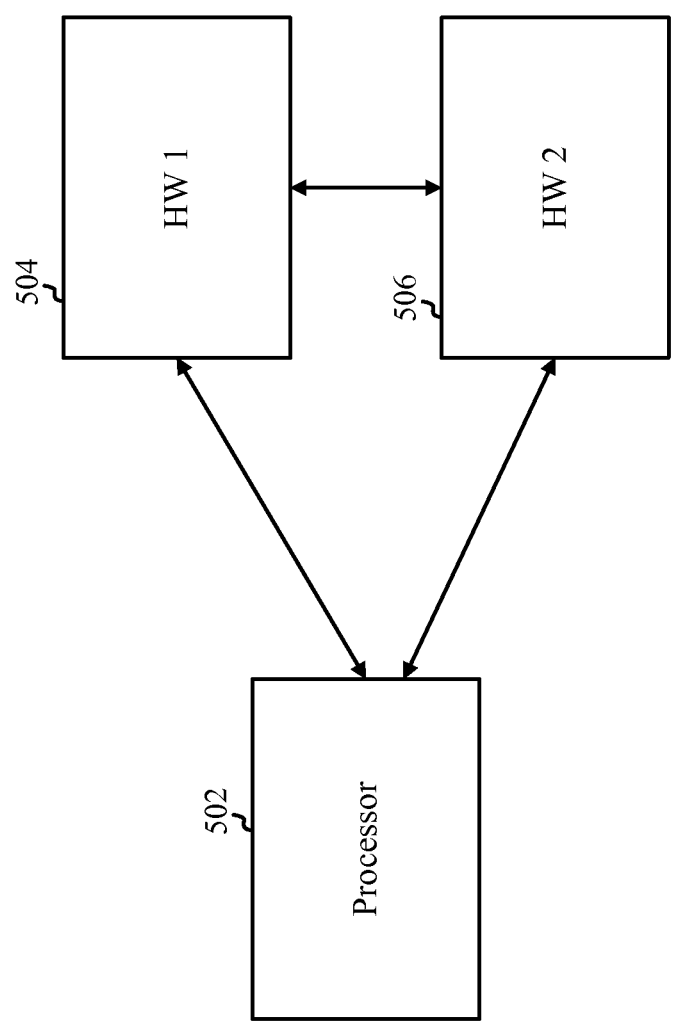
FIG. 5 is a simplified system diagram, in accordance with various disclosed aspects.

FIG. 5 is a simplified block diagram illustrating various disclosed aspects. Processor 502 may be configured to control the operation of various hardware components, such as first hardware component 504 and second hardware component 506. Like in FIG. 4, each of first hardware component 504 and second hardware component 506 may be a dedicated hardware block, such as, for example, a data mover or a hardware accelerator. Processor 502 may have stored thereon software which instructs the hardware components to perform various tasks.

First hardware component 504 and second hardware component 506 may be communicatively coupled to each other. As such, these components may provide information to each other without interrupting the software stored on processor 502. For example, first hardware component 504 and second hardware component 506 may be pre-programmed to perform one or more tasks by processor 502. This process in depicted in greater detail in FIG. 6.

Figure 6:
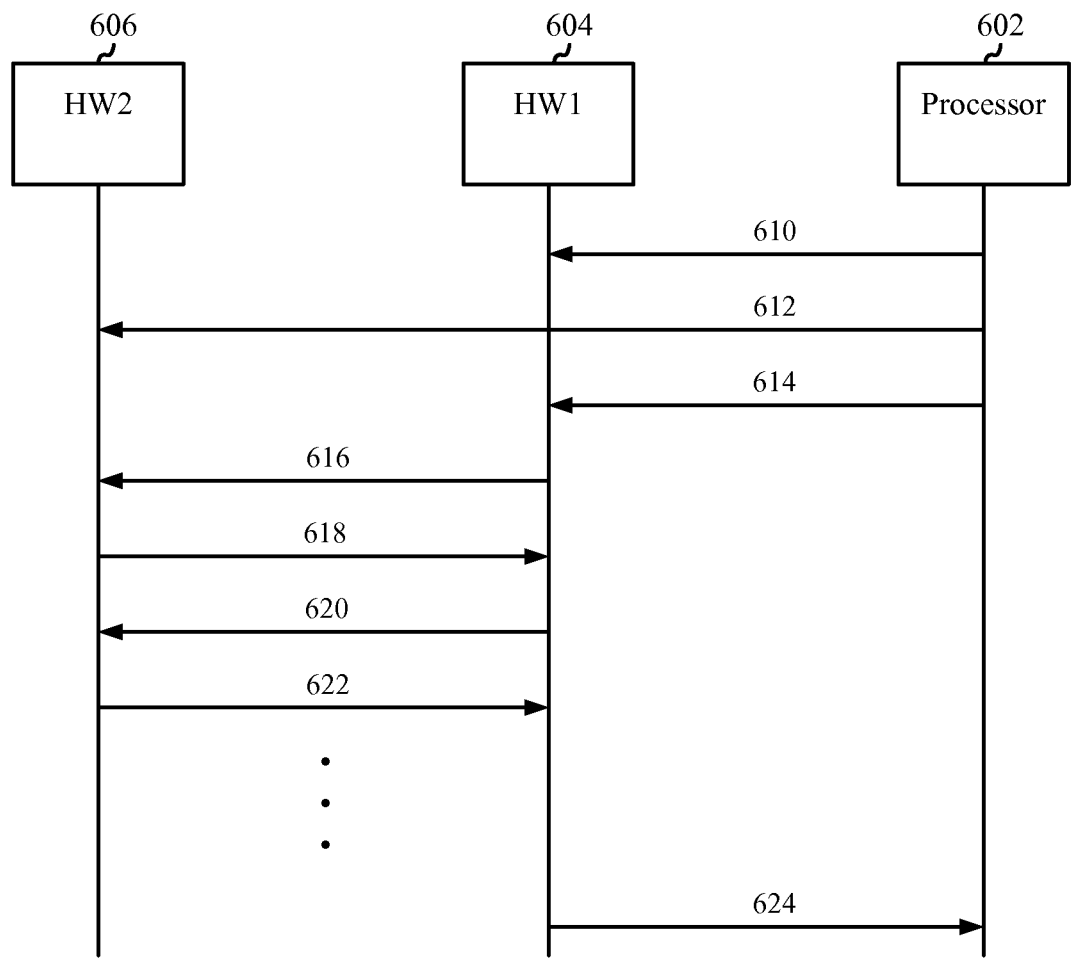
FIG. 6 is a data flow diagram depicting a data processing operation, in accordance with various disclosed aspects.

As depicted in FIG. 6, processor 502 may interface with first hardware component 504 and second hardware component 506. According to some aspects, the first hardware component 504 may be one suited for moving data into a local buffer (e.g., a data mover) from a variety of sources such as external memory. The second hardware component 506 may be a custom hardware block, such as a data accelerator.

As depicted at 610, processor 502 may issue a first set of commands to first hardware component 504 to perform a plurality of tasks. For example, processor 502 may instruct hardware component 504 to move in a block of data from an external storage location. Processor 502 may then program second hardware component 506 to perform a plurality of tasks, as depicted at 612. For example, processor 502 may instruct the second hardware component 506 to operate on the block of data moved in by the first hardware component 504. While the first hardware component and the second hardware component may be pre-programmed to execute the designated tasks, operation does not begin until processor 502 sends a trigger message, as depicted at 614.

Upon receipt of the trigger message, the first hardware component 504 may begin executing the pre-programmed tasks. According to some aspects, the final instruction may direct the first hardware component to send a trigger message to the second hardware component 504, as depicted at 616. The trigger may be, for example a hardware interrupt. As depicted at steps 618, 620 and 622, each hardware component triggers the other component to execute an instruction upon completion of its own processing. There is no need for software interrupts during this processing. When the last instruction has been processed, the hardware component processing the last instruction (here, the first hardware component) may then send an interrupt to processor 502, as depicted at 624. As depicted in FIG. 6, the number of software interrupts may be significantly decreased. In some aspects, only a single software interrupt is required.

Figure 7:
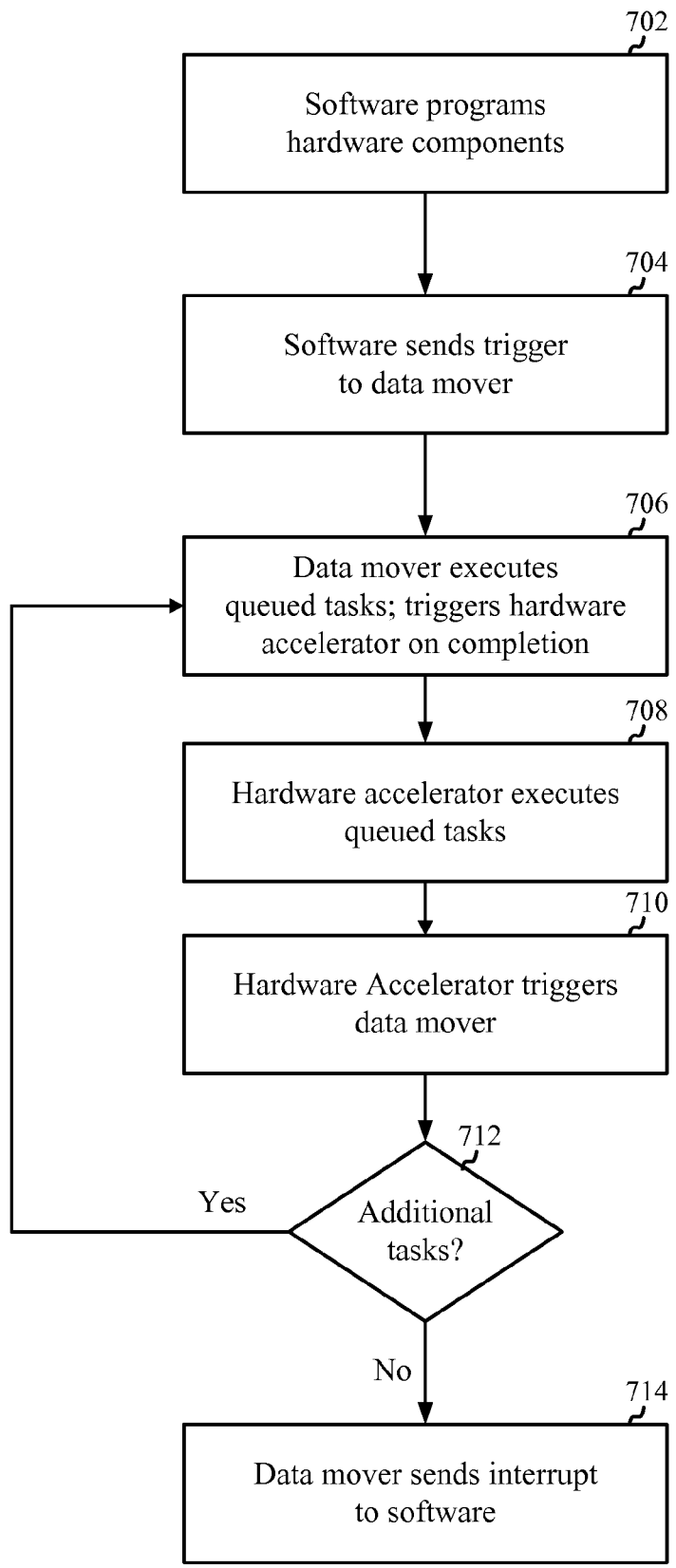
FIG. 7 is a is a flowchart depicting a data processing operation, in accordance with various disclosed aspects.

FIG. 7 is a flowchart depicting a data processing operation in further detail, according to various disclosed aspects. As depicted at 702, the software component may program two or more hardware components. Programming the hardware components may include providing a series of instructions to be executed by each hardware component. The series of instructions may be stored in a task queue associated with the hardware components. According to some aspects, more than one hardware component may share a single task queue, wherein the instructions for each hardware component are interleaved together.

According to an exemplary aspect, the two or more hardware components may include a data mover and a hardware accelerator. Other hardware components may also be used, alternatively or in addition to the data mover and the hardware accelerator. While the remaining processes depicted in FIG. 7 will be described in relation to a data mover and a hardware accelerator, it is noted that this is only exemplary.

As described above, each hardware component may have associated with it a task queue. As such, the data mover and the hardware accelerator each have a task queue associated therewith. The task queues may be configured in advance by software. The task queue associated with the hardware accelerator may be gated by a write pointer which is controlled by software. A read pointer, also associated with the hardware accelerator, may be controlled by hardware.

When execution of the programmed tasks is desired, the software component may send a trigger signal to the data mover, as depicted at 704. Upon receipt of the trigger signal, the data mover may execute its first task, as depicted at 706. For example, the data mover may be instructed to read a first block of data from an external memory location, and move the data into an internal memory location. The data mover may be further instructed to write to the write pointer register associated with the hardware accelerator, thereby triggering the hardware accelerator to begin executing its assigned instructions. The data mover may also be instructed to halt processing until receipt of an event.

Upon receipt of the trigger from the data mover, hardware accelerator may begin executing its instructions, as depicted at 708. This may include, for example, performing various types of operations on the data loaded by the data mover. Upon completion of the queued tasks, the hardware accelerator may issue a hardware interrupt, which triggers the data mover to continue operating, as depicted at 710. Upon receipt of a trigger, the data mover may determine whether it has additional tasks to complete, as depicted at 712. If so, processing returns to step 706. If the data mover does not have additional tasks to perform, it may send an interrupt to software, as depicted at 714. Enabling the data mover and hardware accelerator to trigger each other by way of hardware interrupts reduces interrupt latency and reduces the number of context switches. Moreover, the data mover and hardware accelerator are used more efficiently, thereby reducing overall latency.

As described above, hardware components, such as the hardware accelerator and data mover, may be pre-programmed by software to perform a plurality of tasks. In the case of certain hardware accelerators, the length of the output from the accelerator may be random. However, because the data mover is also pre-programmed, the data move-out instruction is typically programmed for the worst case output from the hardware accelerator. Such a configuration may lead to an unnecessary waste of bandwidth because most of the time the output length would be less than the pre-programmed length.

According to some aspects of the present apparatus and methods, a threshold may be defined which accommodates the data length of the most common outputs of the hardware accelerator. In some aspects, it may be preferable that the threshold be defined such that a majority of all outputs from the hardware accelerator would not exceed the threshold. However, the threshold may be configured according to any other desired parameters. For example, the threshold may be configured such that at least a predefined percentage of all outputs of the accelerator would not exceed the threshold, or such that at least some of the outputs of the accelerator would not exceed the threshold FIG. 8 is a flowchart illustrating threshold processing in further detail.

As depicted at 810, a hardware component, such as a hardware accelerator receives and processes data according to pre-programmed instructions. Upon completion of the processing, the hardware accelerator determines whether the result of the instruction, which is to be output by a second hardware component, such as a data mover, exceeds a pre-defined threshold, as depicted at 812. More particularly, the hardware accelerator may include a threshold determination module which is pre-configured by software. The threshold may set a maximum value for the size of the data processed by the hardware accelerator.

As depicted at 814, if the threshold is exceeded, the hardware accelerator may generate an interrupt indicating that the move-out task was under provisioned. That is, the interrupt indicates that the size of the data move-out, which was pre-programmed in the data mover, is not large enough to accommodate the data just processed by the hardware accelerator. Upon receipt of an interrupt, software may read the excess data beyond the limits of the programmed data move-out size, as depicted at 816. The hardware accelerator may be stalled during this interrupt, and may be given a "go" by the software once the interrupt is resolved. Processing may then continue. For example, the hardware accelerator or the software component may send a trigger to the data mover, and the data mover may move out data according to the pre-programmed instructions, as depicted at 818. If it is determined at step 812 that the threshold is not exceeded, then processing may also continue at step 818, where the data mover moves the data out to main memory as programmed.

Figure 8:
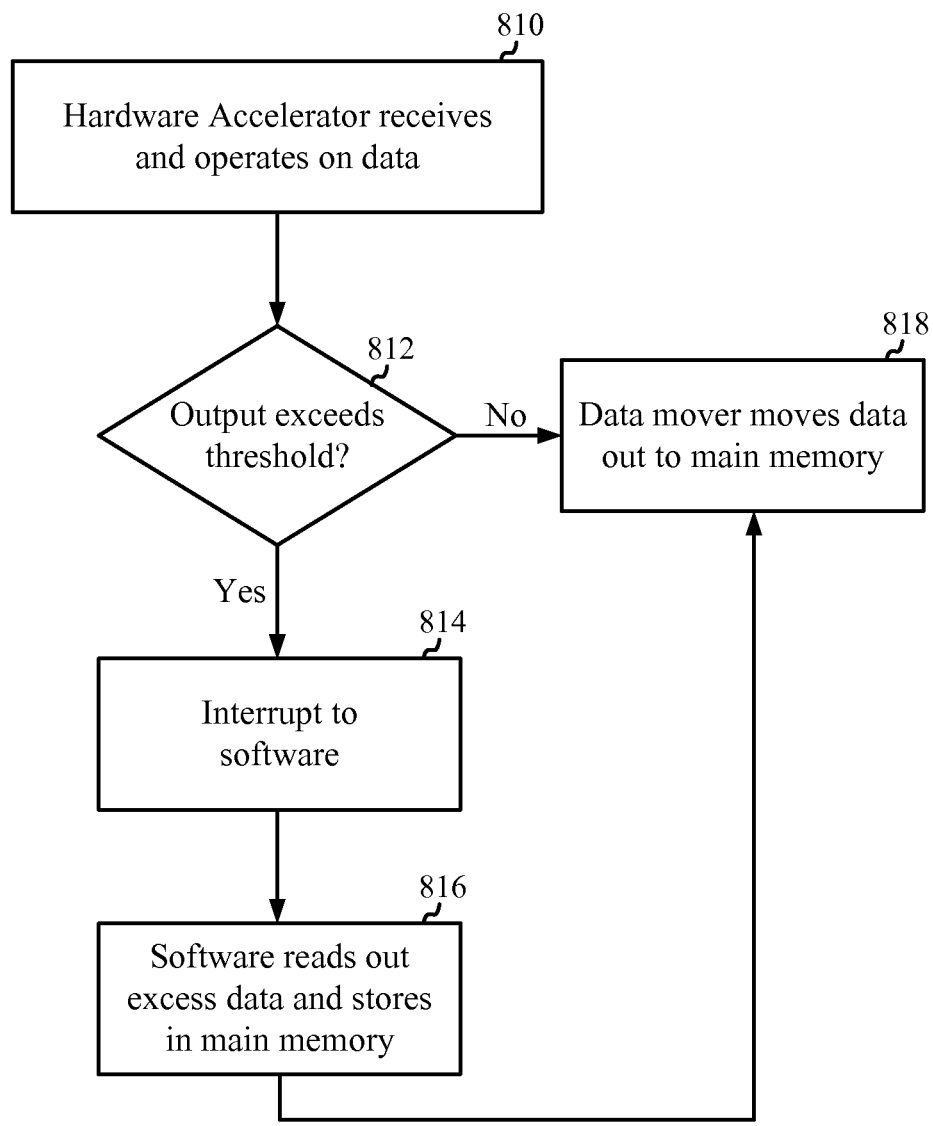
FIG. 8 is a flowchart depicting a threshold processing operation, in accordance with various disclosed aspects.

According to some aspects, the threshold described in reference to FIG. 8 may be adaptively adjusted. For example, if the frequency of interrupts resulting from an under-provisioned data move-out instruction is large over a given period of time, software may increase the size of the threshold. Likewise, the size of the threshold may be decreased if a large number of interrupts are not received over a given period of time. Thus, software may be configured with a timer and a counter which keep track of all interrupts received as a result of un-provisioned data-move out instructions. Controlling the amount of data moved out while providing a mechanism to account for under-provisioning may reduce power consumption and system bus bandwidth. Additionally, software complexity may be reduced by getting a fewere number of interrupts. Moreover, hardware is kept simple by passing exceptional cases to software for handling. Adaptively adjusting the threshold may help to ensure a good trade-off between maintaining a low interrupt rate and avoiding moving data unnecessarily.

According to some aspects, operations typically performed in software may be moved over to hardware to reduce software processing and latency, as well as to reduce use of bus bandwidth. For example, a hardware accelerator may be configured with logic to process data frame headers. Typically, hardware simply deciphers data and then forwards the data to software for further processing. Software then forwards the data back to hardware with instructions for processing the data. This may reduce software processing, latency, and bus bandwidth.

In some exemplary aspects, for example, a hardware accelerator may be configured with logic to parse a data frame header, compare the header to a plurality of predefined templates, and determine a next processing step based on the headers. Software interaction is needed only if a header match is not found, or if template reconfiguration is necessary.

Figure 9:
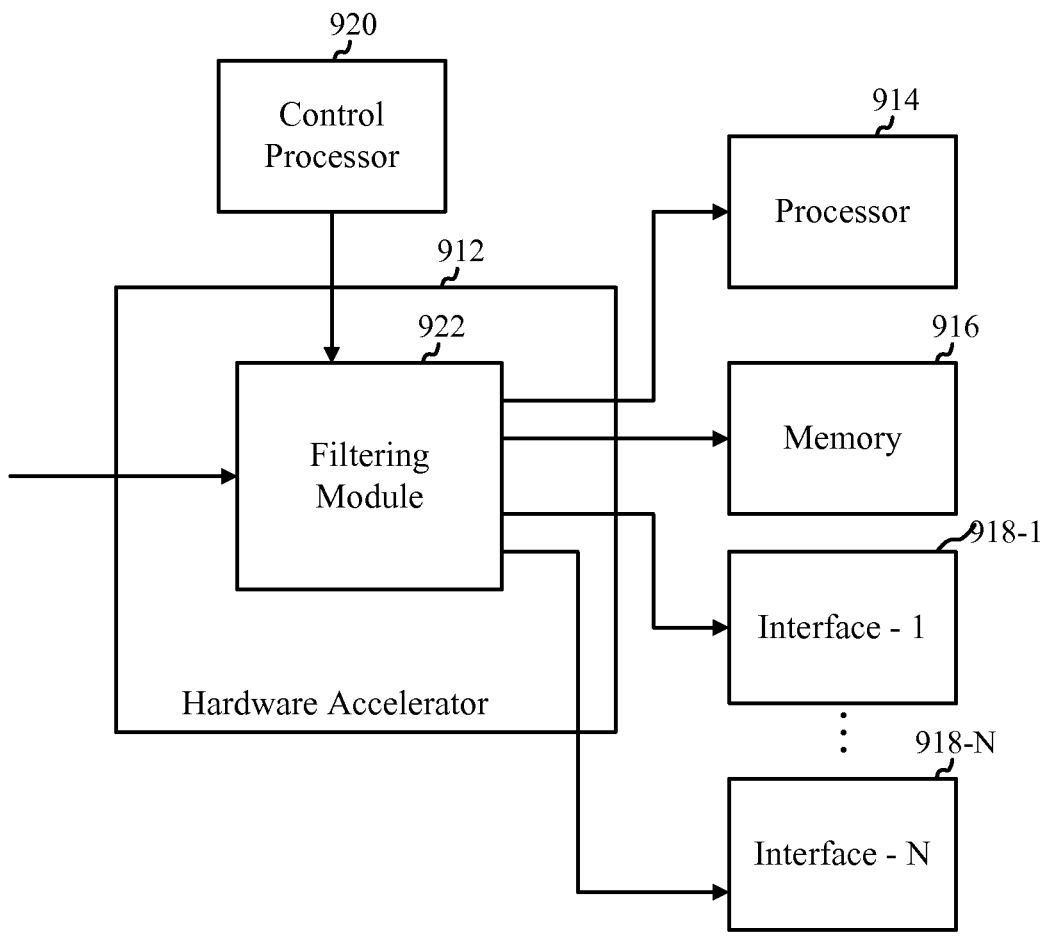
FIG. 9 is a system diagram implementing template processing, in accordance with various disclosed aspects.

FIG. 9 is an example of an environment wherein the template processing may be implemented. As depicted in FIG. 9, hardware accelerator 922, controlled by a control processor 920, may receive input data, and process the input data via a filtering module 922. The filtering module 922 may provide its output to one or more of processor 914, memory 916, or interfaces 918-1 through 918-N. Memory 916 may be an internal or an external memory. Interfaces 918-1 through 918-N may provide connections to external devices, such as, for example, laptops, PDAs, or any other external electronic device. For example, interfaces 918-1 through 918-N may include a USB port, Bluetooth, SDIO, SDCC, or other wired or wireless interfaces.

Filtering module 922 may include a plurality of predefined templates which may be used to make routing decisions as to where output data should be routed. For example, ciphered data may be received by hardware accelerator 912 and deciphered. Based on the template programmed in the filtering module 922, the deciphered data may be forwarded to processor 914, memory 916, or to an external device via interfaces 918-1 through 918-N. According to some aspects, processor 914 may be used as a back-up filter for more complex operations which may be difficult for hardware accelerator 912 to process.

According to some aspects, each traffic template may include one or more parameters and a specific value for each parameter. Each parameter may correspond to a specific field of a header for IP, TCP, UDP, or some other protocol. For example, IP parameters may include source address, destination address, address range, and protocol. TCP or UDP parameters may include source port, destination port, and port range. The traffic template specifies the location of each parameter in the header. Thus, the hardware accelerator need not have any actual knowledge of the protocols in use. Rather, the hardware performs a matching of the header to the template parameters.

For example, traffic templates may be defined to detect for TCP frames for destination port x and sent in IPv4 packets. The template may include three parameters that may be set as follows: version=IPv4, protocol=TCP, and destination port=x. In general, any field in any protocol header may be used as a traffic template parameter. Any number of templates may be defined, and each template may be associated with any set of parameters. Different templates may be defined for different application, sockets, etc., and may be defined with different sets of parameters.

Each template may also be associated with an action to perform if there is a match and an action to perform if there is no match. Upon receipt of a data frame, the received values of the frame may be compared against the specified values of a template. A match may be declared if the received values match the specified values, and no match may be declared otherwise. If no match is defined, hardware may issue a software interrupt, and software may then process the frame.

As described herein, data processing typically involves moving data in from a first location, operating on the data, and moving the data back out. Typically, a single large memory pool is defined in a low cost, high latency memory. Data is moved in from this high latency memory pool, operated on, and then moved back to the memory pool. However, data that has been recently accessed is often re-used. Thus, moving data back out to the high latency memory pool after every access unnecessarily increases system bus bandwidth. According to some aspects of the present apparatus and methods, multiple memory pools may be defined in physical memories. Memory allocation may be based on the best memory pool available, or may depend on how often the data is likely to be accessed.

Figure 10:
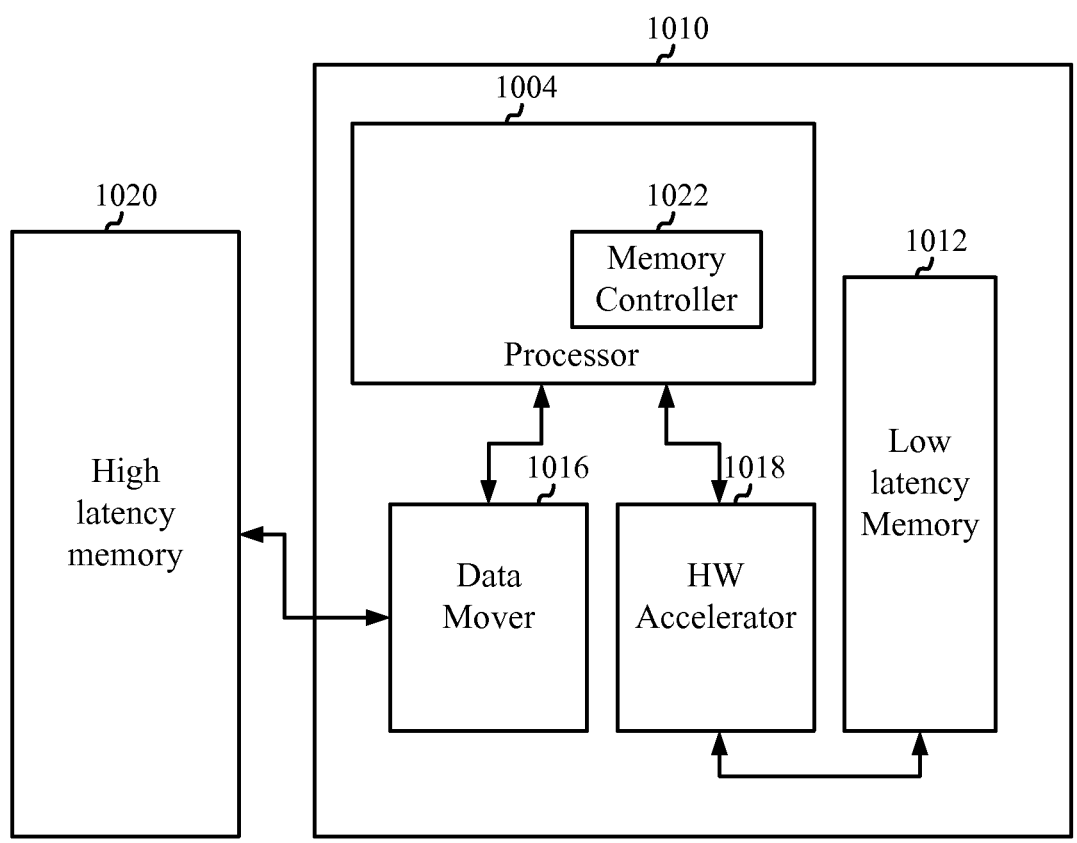
FIG. 10 is a system diagram implementing multiple memory pools, in accordance with various disclosed aspects.

FIG. 10 is an example of a system 1000 implementing multiple memory pools, in accordance with some aspects. System 1000 may include an ASIC 910 comprising low latency memory 1012, processor 1014, data mover 1016, and hardware accelerator 1018. A high latency memory 1020 may also be provided. While low latency memory 912 is depicted as an internal memory and high latency memory 1020 is depicted as an external memory, this configuration is merely exemplary. Either or both memories may be internal or external. Processor 1004 may include a memory controller 1022 which controls access to high latency memory 1020 and low latency memory 1012. If most operations use low latency memory 1012, data can be processed more efficiently. As such, memory controller 1022 may be configured to limit the number of accesses to high latency memory 1020.

As in normal operation, data mover 1020 may be configured to move data in and out, for example, between high latency memory 1020 and low latency memory 912. In accordance with some exemplary aspects, hardware accelerator 1018 may be configured to operate on data directly from low latency memory 1012. For example, in some aspects, data may be maintained in low latency memory 1012 as long as space is available. In other aspects, data may be stored and maintained in low latency memory 1012 based on specific data transmission characteristics, such as quality of service requirements, communication channel properties, and/or other factors.

Providing multiple memory pools may reduce hardware costs, as a small, fast pool and a large, slower pool can be defined. Moreover, system bus bandwidth and power may be reduced.

According to some aspects, data stored in low latency memory 1012 may be accessed by both hardware and software. The payload may be processed by hardware accelerator 1018, ensuring low-latency access. The low latency memory 1012 may be place in close proximity to hardware accelerator 1018. As such, data transfers do not need to cross a system bus, saving power and system bus bandwidth.

When processing data, the data is often copied multiple times while passing through the data stack in order to simplify implementation at each layer (e.g., when removing headers, multiplexing data from multiple flows, segmentation/reassembly, etc.). According to some aspects of the present apparatus and methods, repeated copying may be prevented by leaving data at the same location and having the different layers operate on the same data. Each data operation instruction, whether performed by hardware or software, may point to the same location, such as a local hardware buffer. For example, after UMTS deciphering has been performed, the deciphered data may be copied back into the local memory, such as a local hardware buffer. After software concatenates payloads by evaluating protocol headers, software may instruct a hardware accelerator to perform either TCP checksum calculation or PPP framing. Data need not be moved back and forth from an external memory location during such processing.

For data transmission, data frames are typically partitioned into smaller units, depending on the protocol in use. As such, related payloads are often divided into multiple transmissions. A memory block for each unit is typically allocated, and a linked list of these units is formed to concatenate the payload into larger data units as it is passed to higher layers.

Figure 11:
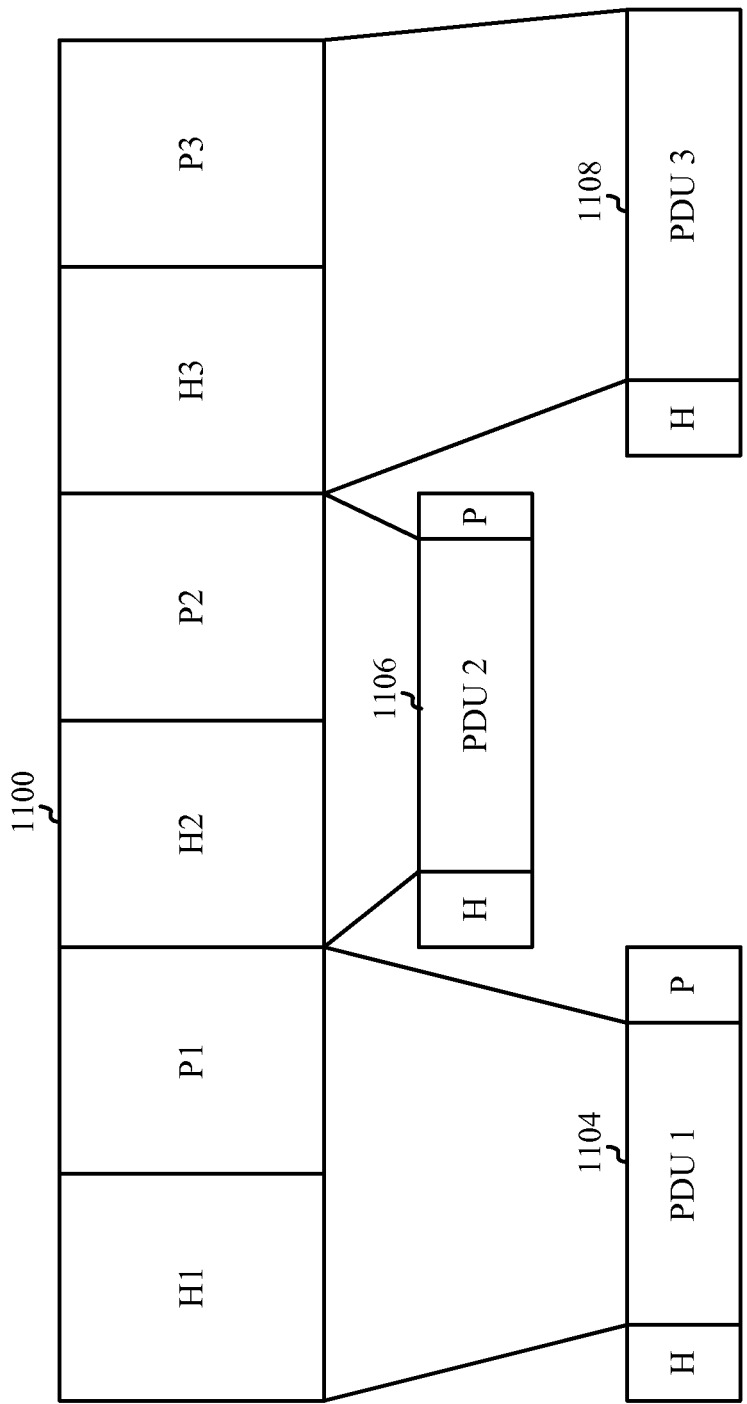
FIG. 11 depicts protocol data unit storage, in accordance with various disclosed aspects.

FIG. 11 depicts the typical storage allocation of received packet data units. As depicted in FIG. 11, an incoming data frame 1100 may include a plurality of protocol data units (PDUs), each comprising a header (H1, H2, H3) and a payload (P1, P2, P3). Typically, the data frame is partitioned into a plurality of segments, wherein each segment is stored in a separate data service memory (DSM) unit. As shown in FIG. 11, PDU1 (H1+P1) is stored in a first DSM unit 1104, PDU2 (H2+P2) is stored in a second DSM unit 1106, and PDU3 (H3+P3) is stored in a third DSM unit 1108.

Storing data in this manner is inefficient for various reasons. For example, each DSM unit includes its own header H, which adds to overhead. Additionally, each DSM unit within a DSM pool is identically sized. As such, space is wasted when a PDU is smaller than the pre-configured DSM unit size. As depicted at 1104 and 1108 padding data P is added after the PDU to fill the DSM unit. Moreover, to later concatenate the segmented PDUs, linked lists must be maintained that indicated where each PDU is stored and how it relates to the others.

According to some exemplary aspects of the present apparatus and methods, received data may be aggregated per channel from different transmission into larger blocks of contiguous memory by removing headers and thereby directly concatenating continuous payloads for higher layers. This may result in application data coherency as wells as a reduced need for additional memory allocations due to concatenation. Moreover, memory is reduced due to a reduction of padding overhead, memory allocation operations, and memory overhead.

As described above, when hardware receives a ciphered data frame, the frame is deciphered, and then forwarded to hardware for further processing. According to some exemplary aspects, hardware components, such as hardware accelerators, may be further configured to concatenate related payloads without forwarding the frames to software.

Figure 12:
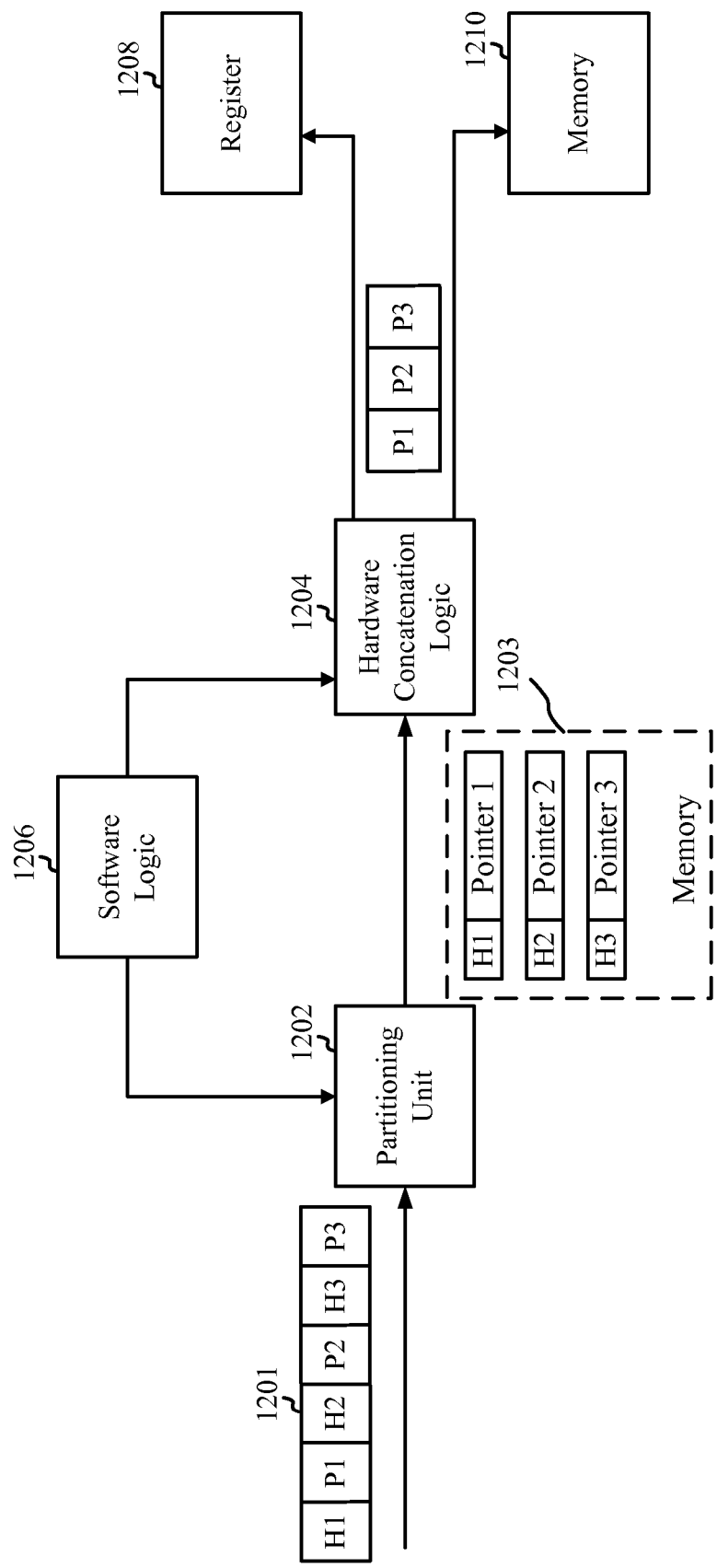
FIG. 12 is a simplified block diagram illustrating data processing and storage, in accordance with various disclosed aspects.

FIG. 12 is a simplified block diagram illustrating data processing and storage, according to some aspects. As depicted in FIG. 12, an incoming data frame 1201 may include a plurality of protocol data units, each comprising a header and a payload. Partitioning unit 1202 may be configured to process the incoming data frame 1201 Processing may include, for example, separating the headers and payloads. The headers (H1, H2, H3) may be stored in memory 1203, along with a pointer to the associated payload.

Hardware concatenation logic 1204 may then combine the payloads and store them in a single DSM. Both partitioning unit 1202 and hardware concatenation logic 1204 may be programmed and/or controlled by software logic 1206. For example, software logic 1206 may program the partitioning unit 1202 to remove the headers and to generate pointer information. Additionally, software logic 1206 may direct the concatenation logic 1204 to fetch certain payloads or headers.

According to some aspects, data from multiple transmissions may be combined in a single DSM. Data may be passed along to other layers once stored in the DSM, even if the DSM is not full. Additionally data may be added to the end of the DSM unit.

Typically headers and payloads are not separated from each other when data is received. Rather, the header and payload are typically stored together. However, most decisions on how to process a packet are based only on the packet header. According to some aspects of the present apparatus and methods, only the header may be moved from layer to layer. Therefore, the payload may be moved only when necessary for processing, thus improving payload data coherency and cache efficiency, and reducing bus utilization.

Figure 13:
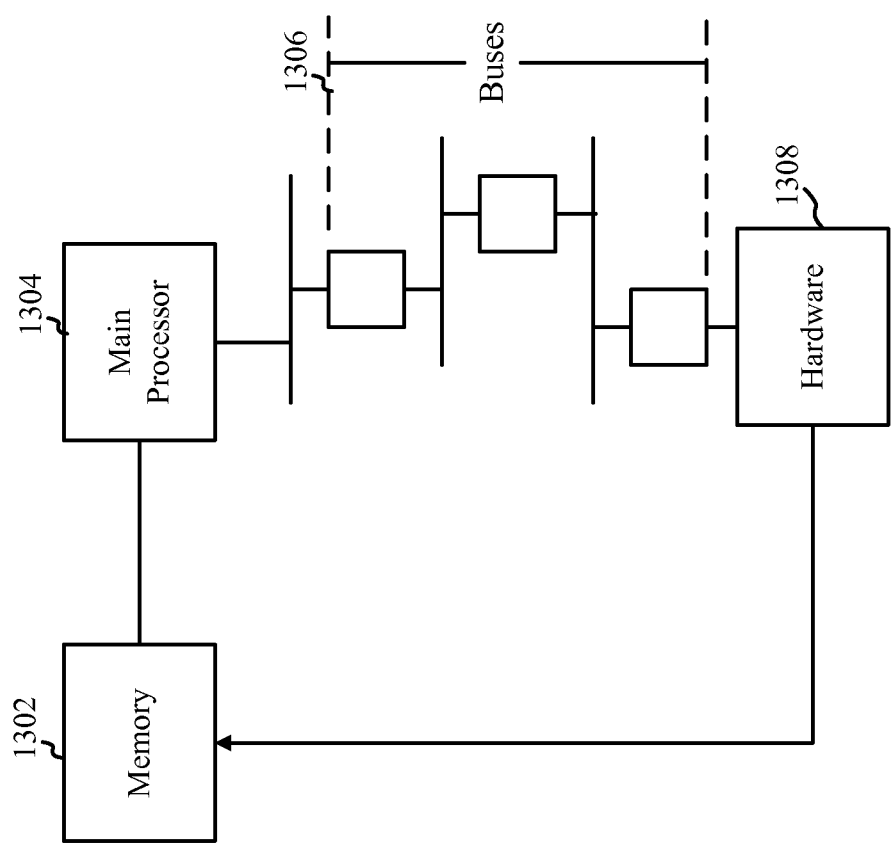
FIG. 13 is a block diagram depicting a typical wireless device.

In a typical wireless device, a main processor handles all modem related functionality. FIG. 13 is a block diagram depicting a typical configuration. Main processor 1304 is communicatively coupled to hardware 1308 via a plurality of buses 1306. Memory 1302 is provided for storing data operated on by hardware 1308. In operation, whenever main processor 1304 issues an instruction to hardware 1308, the instruction must traverse the plurality of buses 1306. Moreover, the hardware 1308 must issue a software interrupt back to main processor 1304 after completing each instruction. Traversing the buses and issuing software interrupts adds substantial processing latency.

Figure 14:
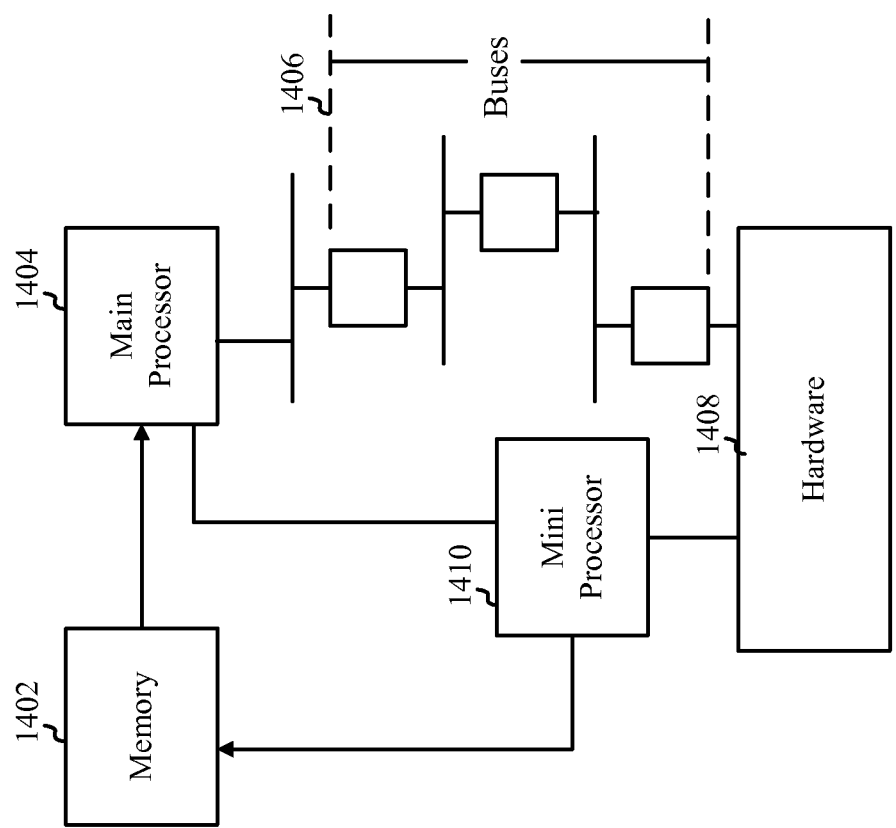
FIG. 14 is a block diagram depicting an exemplary wireless device, in accordance with various disclosed aspects.

In accordance with various exemplary aspects, a mini-processor may be provided which is closely located to the hardware, thereby reducing latency. FIG. 14 is a block diagram depicting such a configuration. Main processor 1404 is communicatively coupled to hardware 1408 via a plurality of buses 1406. Memory 1402 is provided for storing data processed by hardware 1408.

Mini-processor 1410 is provided in close proximity to hardware 1408. Mini-processor 1410 may be a flexibly programmable processor having access to the same memory 1402 as the main processor 1404. The mini-processor 1410 may be programmed to interact directly with the hardware 1408. The mini-processor 1410 may be programmed to direct hardware 1408 to perform tasks such as header extraction, ciphering, deciphering, data movement, contiguous storage, IP filtering, header insertion, PPP framing, and/or other tasks.

According to some aspects, when new information is received at a wireless device, the main processor 1404 may direct the mini-processor 1410 to begin processing the data and to store the results, after processing by hardware 1408, into memory 1402. Thus, hardware no longer has to interrupt back to the main processor 1414 after each task. Additionally, because the mini-processor 1410 is programmable, it can easily be re-programmed if there is a change in processing requirements. For example, if there is a change in the air interface, or if a new protocol release is available, the mini-processor 1410 can be reprogrammed to implement the change.

In accordance with the configuration depicted in FIG. 14, latency is reduced as compared to a pure software implementation. Additionally, there may be a reduction in interrupts, memory access, and bus latency. Moreover, power consumption may be lowered, as the mini-processors may be implemented closes to the hardware memory than in a pure software application.

Figure 15:
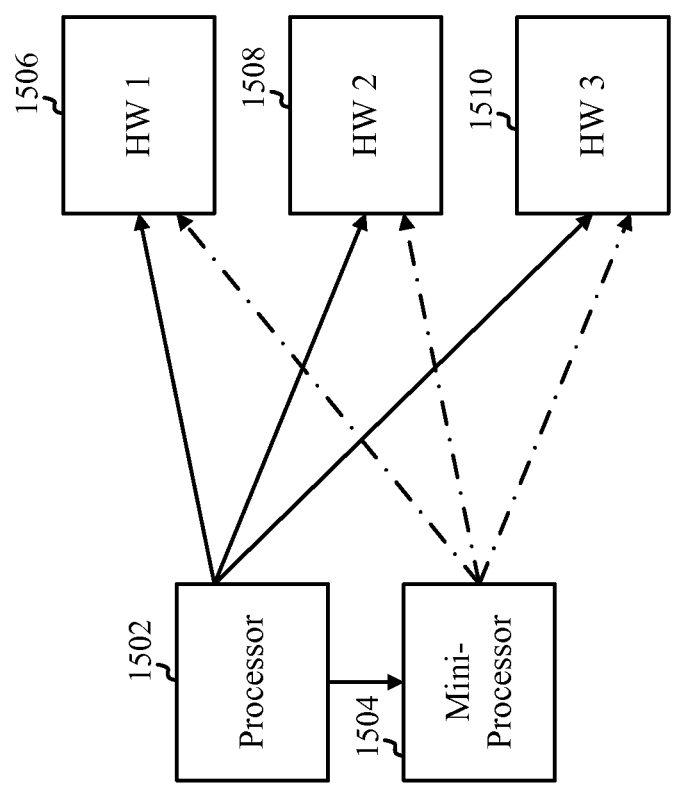
FIG. 15 is a simplified block diagram implementing a mini-processor, in accordance with various disclosed aspects.

According to some aspects, both a main processor and a mini-processor may have access to one or more dedicated hardware blocks. This is depicted in FIG. 15. A main processor 1502 and mini-processor 1504 are each communicatively coupled to a plurality of dedicated hardware blocks. The plurality of dedicated blocks include a first hardware block 1506, a second hardware block 1508, and a third hardware block 1510. The hardware blocks may include, for example, a hardware accelerator, a data mover, a ciphering engine, a deciphering engine, and/or any other dedicated hardware blocks.

Main processor 1502 and mini-processor 1504 may each simultaneously access a different one of hardware blocks 1504, 1506, and 1508. This allows for parallel processing. For example, main processor 1502 may be configured to access first hardware block 1506, which may be dedicated to deciphering, while mini-processor 1504 may be configured to simultaneously access second hardware block 1508, which may be dedicated to ciphering. Thus, uplink and downlink processing can occur simultaneously.

Figure 16:
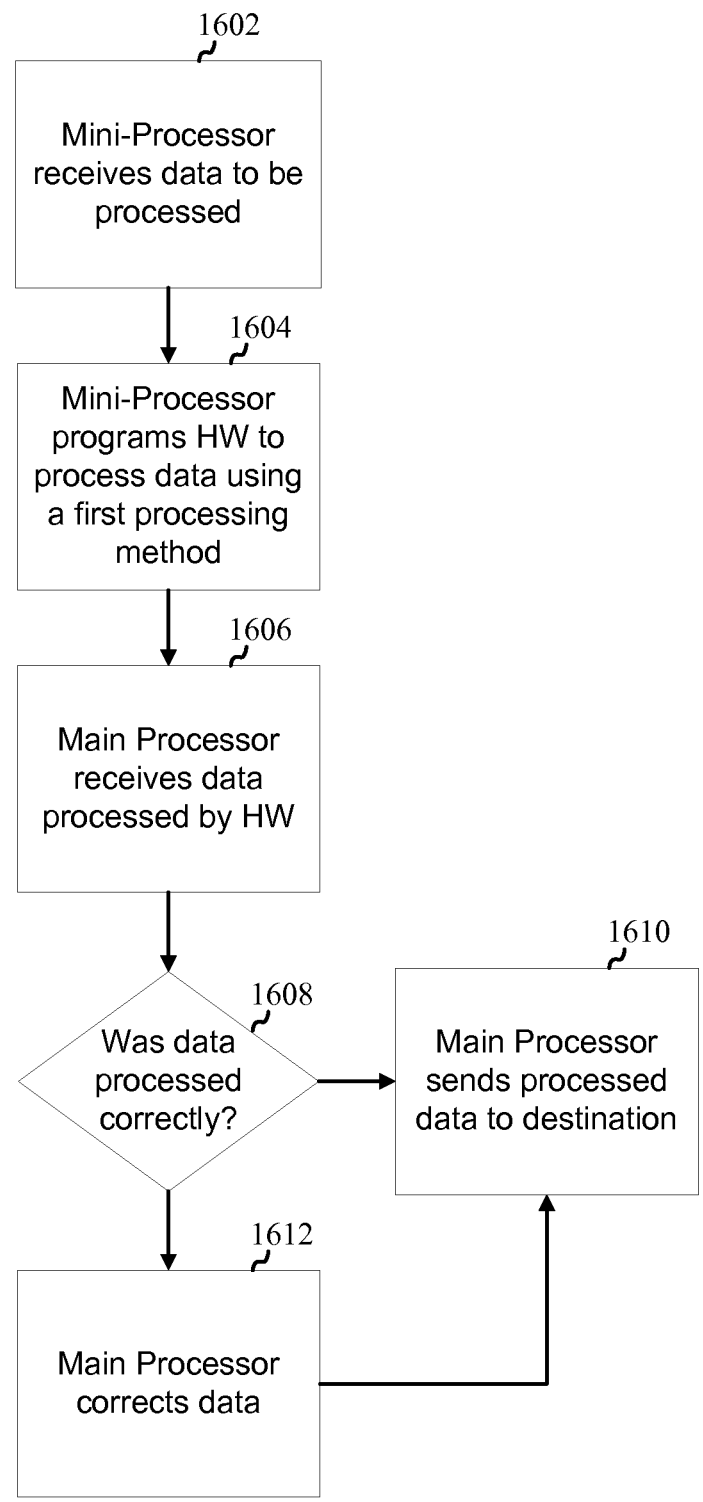
FIG. 16 is a flowchart depicting a data processing method using a mini-processor, in accordance with various disclosed aspects.

The mini-processor (such as mini-processor 1504 depicted in FIG. 15), may be unable to handle complex tasks. For example, in dealing with retransmission of packets, there is complex logic involved in determining when sequence numbers rollover. According to some aspects, the main processor may be configured to serve as a back-up to the mini-processor and handle those complex tasks which cannot be properly handled by the mini-processor. FIG. 16 is a flowchart depicting a process for handling such complex logic.

As depicted at 1602, the process beings when the mini-processor receives data to be processed. According to some aspects, the mini-processor may be programmed to always process a certain type of task using a pre-defined processing method. Thus, as depicted at 1604, the mini-processor may be configured to instruct hardware to process data using a first processing method. For example, in the case of determining whether sequence numbers should roll over, the mini processor may be configured to always assume that the sequence numbers do not roll over.

As depicted at 1606, the main processor receives the data processed by hardware. The main processor may also receive an indication of how the data was processed. As depicted at 1608, the main processor determines whether the data was processed correctly. If so, the main processor simply forwards the data to its destination, such as memory, as depicted at 1610. If, however, the main processor detects that the data was not processed correctly, the main processor can reverse the actions performed by the hardware and re-program the hardware to process the data correctly, as depicted at 1612.

Figure 17:
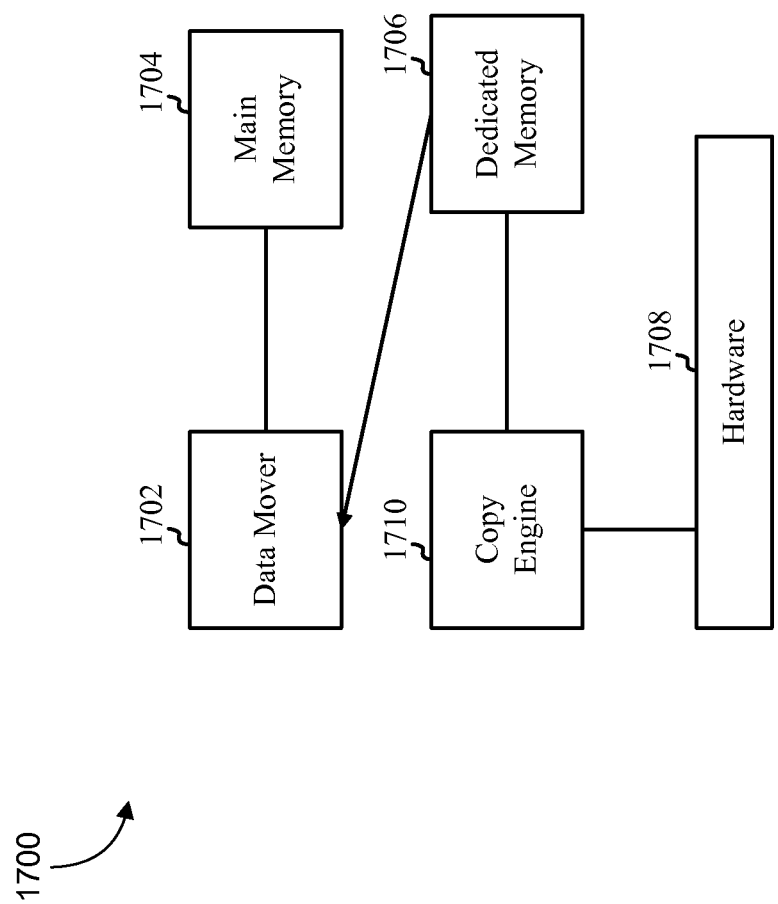
FIG. 17 is a block diagram implementing a copy engine, in accordance with various disclosed aspects.

In typical data moving operations, a processor programs a data mover to perform a copy task for each chunk of data to be moved. According to various exemplary aspects, a copy engine may be included which is closely located to hardware. FIG. 17 is a block diagram of a system 1700 incorporating a copy engine. System 1700 comprises data mover 1702, main memory 1704, copy engine 1710, copy engine memory 1706, and hardware 1708. Copy engine 1710 may be programmed to operate directly on hardware 1708 to facilitate copy and/or data move operations. Copy engine 1710 may have associated therewith its own dedicated memory 1706 which reduces latency associated with storing and retrieving data from main memory 1704. Data mover 1702 may be programmed to fetch data from the copy engine memory 1706 and store it in main memory 1704.

Including a copy engine allows for bit-level granularity to support protocols with bit-level widths. Additionally, programming overhead may be reduced by allowing the copying of evenly scattered source data to evenly scatterd destination locations using a single programming task. Moreover, the copy engine may be used for any type of operation used by software, for example, header extraction and insertions, data concatenation or segmentation, byte/word alignment, as well as regular data-mover tasks for data manipulation.

Figure 18:
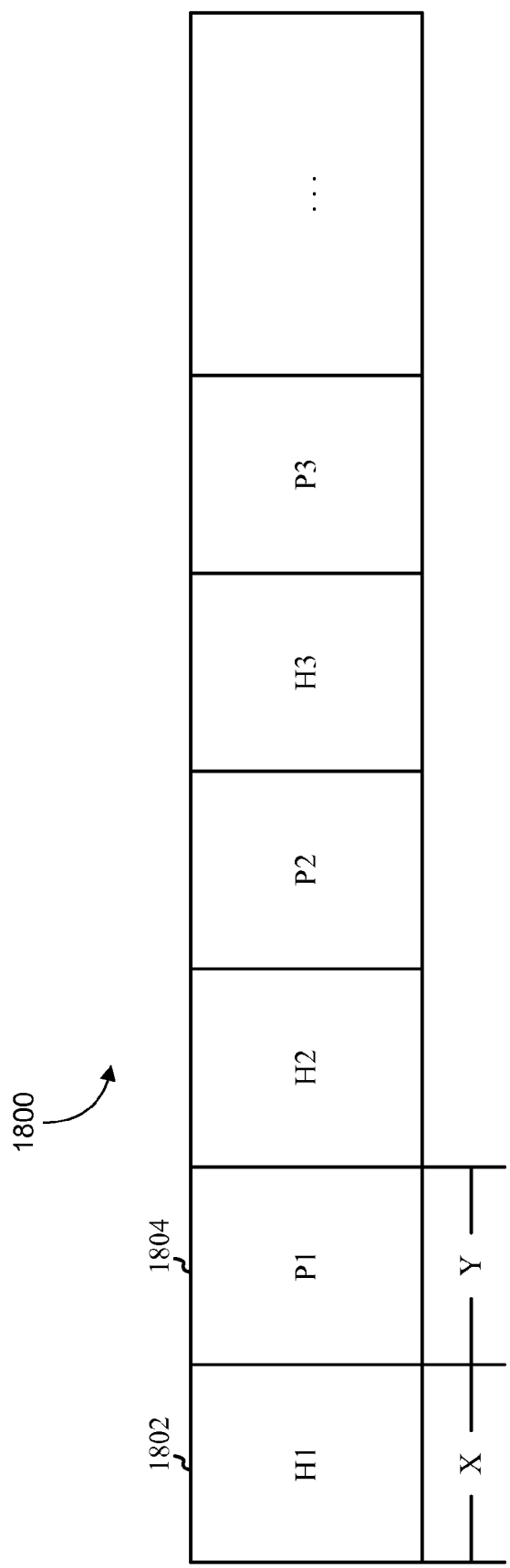
FIG. 18 depicts an exemplary data frame, in accordance with various disclosed aspects.

According to some aspects, copy engine 1710 may be programmed to copy data from multiple PDUs in a single tasks. As depicted in FIG. 18, a data frame may include a plurality of PDUs, each comprising a header (H1, H2, and H3), and a payload (P1, P2, P3). The size of the headers and payloads may be known a priori, and a copy engine may be programmed to know these sizes. For example, as depicted in FIG. 18, all headers, such as header 1802 may be of size X, while all payloads, such as payload 1804, may be of size Y. A copy engine may be programmed to copy N headers or N payloads in a single task based on knowledge of the header and payload sizes.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A data processing method, comprising:
   receiving, at a hardware component, an input data frame comprising a plurality of protocol data units (PDUs);
   extracting a header from each of the PDUs and storing the extracted headers in a first memory location;
   storing a payload from each of the PDUs in a contiguous block of a data service memory (DSM) unit;
   generating, for each extracted header, a pointer to a storage location of the payload associated with the extracted header stored within the DSM unit;
   transmitting the extracted headers to a higher protocol layer for processing; and
   transmitting the stored payloads associated with the extracted headers, from the storage location of the stored payloads stored within the DSM unit, to the higher protocol layer at a time of processing by the higher protocol layer.

2. The method of claim 1, wherein the input data frame comprises PDUs from more than one transmission.

3. The method of claim 1, wherein the DSM unit is of a fixed size, and wherein the method further comprises:
   receiving additional payloads; and
   storing the additional payloads at the end of the DSM unit if space is available.

4. The data processing method of claim 1, wherein the hardware component comprises a hardware accelerator, the hardware accelerator configured to concatenate the payloads from each of the PDUs for storage in the contiguous block of the DSM unit without forwarding the payloads to software.

5. The data processing method of claim 1, further comprising transmitting the stored payloads stored in the contiguous block of the DSM unit independently from other stored payloads stored in the contiguous block of the data service memory unit.

6. The method of claim 1, wherein the stored payloads and the extracted payloads are identified by pointer information generated after removing the headers from the payloads.

7. A computer program product, comprising:
   a computer-readable medium comprising:
      a first set of codes for causing a computer to receive, at a hardware component, an input data frame comprising a plurality of protocol data units (PDUs);
      a second set of codes for causing the computer to extract a header from each of the PDUs and storing the extracted headers in a first memory location;
      a third set of codes for causing the computer to store a payload from each of the PDUs in a contiguous block of a data service memory (DSM) unit;
      a fourth set of codes for causing the computer to generate, for each extracted header, a pointer to a storage location of the payload associated with the header stored within the DSM unit;
      a fifth set of codes for causing the computer to transmit the extracted headers to a higher protocol layer for processing; and
      sixth set of codes for causing the computer to transmit the stored payloads associated with the extracted headers, from the storage location of the stored payloads stored within the DSM unit, to the higher protocol layer at a time of processing by the higher protocol layer.

8. The computer program product of claim 7, wherein the DSM unit is of a fixed size, and wherein the computer-readable medium further comprises:
   a seventh set of codes for receiving additional payloads; and
   an eighth set of codes for storing the additional payloads at the end of the DSM unit if space is available.

9. The computer program product of claim 7, wherein the hardware component comprises a hardware accelerator, the hardware accelerator configured to concatenate the payloads from each of the PDUs for storage in the contiguous block of the DSM unit without forwarding the payloads to software.

10. The computer program product of claim 7, wherein the computer-readable medium further comprises a ninth set of codes for transmitting the stored payloads stored in the contiguous block of the DSM unit independently from other stored payloads stored in the contiguous block of the data service memory unit.

11. An apparatus, comprising:
    means for receiving, at a hardware component, an input data frame comprising a plurality of protocol data units (PDUs);
    means for extracting a header from each of the PDUs and storing the extracted headers in a first memory location;
    means for storing a payload from each of the PDUs in a contiguous block of a data service memory (DSM) unit;
    means for generating, for each extracted header, a pointer to a storage location of the payload associated with the header stored within the DSM unit;
    means for transmitting the extracted headers to a higher protocol layer for processing; and
    means for transmitting the stored payloads associated with the extracted headers, from the storage location of the stored payloads stored within the DSM unit, to the higher protocol layer at a time of processing by from the higher protocol layer.

12. The apparatus of claim 11, wherein the DSM unit is of a fixed size, and wherein the apparatus further comprises:
    means for receiving additional payloads; and
    means for storing the additional payloads at the end of the DSM unit if space is available.

13. The apparatus of claim 11, further comprising a means for concatenating the payloads from each of the PDUs for storage in the contiguous block of the DSM unit without forwarding the payloads to software.

14. The apparatus of claim 11, further comprising means for transmitting the stored payloads stored in the contiguous block of the DSM unit independently from other stored payloads stored in the contiguous block of the data service memory unit.

15. At least one processor, comprising:
    a first module for receiving, at a hardware component, an input data frame comprising a plurality of protocol data units (PDUs);

a second module for extracting a header from each of the PDUs and storing the extracted headers in a first memory location;

a third module for storing a payload from each of the PDUs in a contiguous block of a data service memory (DSM) unit;

a fourth module for generating, for each extracted header, a pointer to a storage location of the payload associated with the header stored within the DSM unit;

a fifth module for transmitting the extracted headers to a higher protocol layer for processing; and sixth module for transmitting the stored payloads associated with the extracted headers, from the storage location of the stored payloads stored within the DSM units, to the higher protocol layer at a time of processing by the higher protocol layer.

16. The at least one processor of claim 15, wherein the DSM unit is of a fixed size, and wherein the at least one processor is further configured to comprise:

a seventh module for receiving additional payloads; and an eighth module for storing the additional payloads at the end of the DSM unit if space is available.

17. The at least one processor of claim 15, wherein the first module is further configured to concatenate the payloads from each of the PDUs for storage in the contiguous block of the DSM unit without forwarding the payloads to software.

18. The at least one processor of claim 15, wherein the at least one processor is further configured to comprise a ninth module for transmitting the stored payloads stored in the contiguous block of the DSM unit independently from other stored payloads stored in the contiguous block of the data service memory unit.

19. A data processing apparatus, comprising:

a partitioning unit for receiving an input data frame comprising a plurality of protocol data units (PDUs) and extracting a header from each of the PDUs;

a first memory for storing the extracted headers;

a hardware concatenation unit for storing a payload from each of the PDUs in a contiguous block of a data service memory (DSM) unit; and a transmitter for transmitting the extracted headers to a higher protocol layer for processing, wherein the partitioning unit is further configured to generate, for each extracted header, a pointer to a storage location of the payload associated with the extracted header stored within the DSM unit, and wherein the transmitter is further configured to transmit the stored payloads associated with the extracted headers, from the storage location of the stored payloads stored within the DSM unit, to the higher protocol layer at a time of processing by the higher protocol layer.

20. The data processing apparatus of claim 19, wherein the input data frame comprises PDUs from more than one transmission.

21. The data processing apparatus of claim 19, wherein the DSM unit is of a fixed size.

22. The data processing apparatus of claim 19, wherein the DSM unit is of a fixed size, and wherein the data processing apparatus is further configured to receive additional payloads and store the additional payloads at the end of the DSM unit if space is available.

23. The data processing apparatus of claim 19, wherein the hardware concatenation unit is further configured to concatenate the payloads from each of the PDUs for storage in the contiguous block of the DSM unit without forwarding the payloads to software.

24. The data processing apparatus of claim 19, wherein the transmitter is further configured to transmit the stored payloads stored in the contiguous block of the DSM unit independently from other stored payloads stored in the contiguous block of the DSM unit.

* * * * *